United States Patent
Bosworth et al.

(10) Patent No.: US 10,850,397 B2
(45) Date of Patent: Dec. 1, 2020

(54) SYSTEM AND METHOD FOR PROVIDING IN-COCKPIT ACTUATION OF AIRCRAFT CONTROLS

(71) Applicant: Aurora Flight Sciences Corporation, Manassas, VA (US)

(72) Inventors: William Bosworth, Cambridge, MA (US); James D. Paduano, Boston, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 372 days.

(21) Appl. No.: 15/957,571

(22) Filed: Apr. 19, 2018

(65) Prior Publication Data

US 2019/0321981 A1  Oct. 24, 2019

(51) Int. Cl.
  *B25J 9/16* (2006.01)
  *B64C 13/18* (2006.01)
  *B25J 15/00* (2006.01)

(52) U.S. Cl.
  CPC ........... *B25J 9/1679* (2013.01); *B25J 9/1669* (2013.01); *B25J 9/1697* (2013.01);
  (Continued)

(58) Field of Classification Search
  CPC ...... B25J 9/1679; B25J 9/1669; B25J 9/1697; B25J 15/0019; B25J 9/163; B25J 9/04; B25J 19/021; B25J 11/008; B25J 5/02; B64C 13/18; B64C 13/02; Y10S 901/47; Y10S 901/09; Y10S 901/30; G05B 2219/40039
  See application file for complete search history.

(56) References Cited

U.S. PATENT DOCUMENTS 4,063,073 A   12/1977  Strayer
5,157,615 A   10/1992  Brodegard et al.
(Continued)

FOREIGN PATENT DOCUMENTS

EP            2251851           11/2010
WO    WO 2016/035002           3/2016

OTHER PUBLICATIONS

Extended European Search Report, dated Dec. 13, 2018, in European application No. 18183666.9.
(Continued)

*Primary Examiner* — Basil T. Jos
(74) *Attorney, Agent, or Firm* — Michael Stanley Tomsa; McAndrews, Held & Malloy, Ltd.; Eugene H. Nahm

(57) ABSTRACT

An actuation system to manipulate an interface in an aircraft having an actuation controller, a vision system, a robotic arm, and a housing. Each of the vision system and the robotic arm assembly may be operatively coupled to the actuation controller. The vision system may be configured to optically image a display device of the preexisting interface, while the robotic arm assembly may be configured to engage a user-actuable device of the preexisting interface. The housing can be configured to affix to a surface adjacent the preexisting interface, where each of the vision system and the robotic arm assembly are coupled to the housing. In operation, the actuation controller may be configured to instruct the robotic arm assembly based at least in part on data from the vision system.

21 Claims, 11 Drawing Sheets

(52) U.S. Cl.
CPC ........... *B25J 15/0019* (2013.01); *B64C 13/18* (2013.01); *B25J 9/163* (2013.01); *Y10S 901/09* (2013.01); *Y10S 901/30* (2013.01); *Y10S 901/47* (2013.01)

(56) References Cited

U.S. PATENT DOCUMENTS

| | | | |
|---|---|---|---|
| 5,283,643 | A | 2/1994 | Fujimoto |
| 6,480,152 | B2 | 11/2002 | Lin et al. |
| 6,604,044 | B1 | 8/2003 | Kirk |
| 6,820,006 | B2 | 11/2004 | Patera |
| 6,993,420 | B2 | 1/2006 | Le Draoullec et al. |
| 7,106,219 | B2 | 9/2006 | Pearce |
| 7,176,830 | B2 | 2/2007 | Horibe |
| 7,193,729 | B1 | 3/2007 | Li |
| 7,203,630 | B2 | 4/2007 | Kolb et al. |
| 7,437,220 | B2 | 10/2008 | Stefani |
| 7,624,943 | B2 | 12/2009 | Cerchie et al. |
| 7,650,232 | B1 | 1/2010 | Paielli |
| 7,784,741 | B2 | 8/2010 | Cerchie et al. |
| 7,848,698 | B2 | 12/2010 | Batcheller et al. |
| 7,954,965 | B1 | 6/2011 | Boyd et al. |
| 8,026,827 | B1 | 9/2011 | Boyd et al. |
| 8,049,658 | B1 | 11/2011 | Lagonik et al. |
| 8,052,096 | B2 | 11/2011 | Cerchie et al. |
| 8,290,638 | B2 | 10/2012 | Eicke et al. |
| 8,306,672 | B2 | 11/2012 | Nickolaou |
| 8,319,665 | B2 | 11/2012 | Weinmann et al. |
| 8,319,666 | B2 | 11/2012 | Weinmann et al. |
| 8,346,480 | B2 | 1/2013 | Trepagnier et al. |
| 8,373,751 | B2 | 2/2013 | Han et al. |
| 8,411,145 | B2 | 4/2013 | Fardi |
| 8,466,827 | B2 | 6/2013 | Nanami |
| 8,504,223 | B2 | 8/2013 | Boorman et al. |
| 8,616,883 | B2 | 12/2013 | Wokurka |
| 8,616,884 | B1 | 12/2013 | Lechner et al. |
| 8,768,534 | B2 | 7/2014 | Lentz |
| 9,052,393 | B2 | 6/2015 | Kriel et al. |
| 9,097,801 | B2 | 8/2015 | Kambe et al. |
| 9,202,098 | B2 | 12/2015 | Lewis et al. |
| 9,507,021 | B2 | 11/2016 | Lynam |
| 2002/0004695 | A1 | 1/2002 | Glenn et al. |
| 2005/0151025 | A1 | 7/2005 | Mendelson et al. |
| 2007/0236366 | A1 | 10/2007 | Gur et al. |
| 2008/0316010 | A1 | 12/2008 | Chang |
| 2009/0198392 | A1 | 8/2009 | Eicke et al. |
| 2009/0295602 | A1 | 12/2009 | Cernasov et al. |
| 2011/0149067 | A1 | 6/2011 | Lewis et al. |
| 2011/0160950 | A1 | 6/2011 | Naderhirn et al. |
| 2011/0171611 | A1 | 7/2011 | Batcheller et al. |
| 2011/0288773 | A1 | 11/2011 | Hoy |
| 2014/0080099 | A1 | 3/2014 | Sowadski et al. |
| 2014/0210648 | A1 | 7/2014 | Samuthirapandian et al. |
| 2015/0094982 | A1 | 4/2015 | Dupont De Dinechin |
| 2015/0323932 | A1 | 11/2015 | Paduano et al. |
| 2015/0339929 | A1 | 11/2015 | Hedrick et al. |
| 2016/0019793 | A1 | 1/2016 | Fournier et al. |
| 2016/0076992 | A1* | 3/2016 | Gillespie ............ G01N 21/01 356/244 |
| 2016/0124429 | A1 | 5/2016 | Schultz |
| 2016/0264254 | A1 | 9/2016 | Jajur et al. |
| 2016/0275802 | A1 | 9/2016 | Loegering |
| 2017/0084183 | A1 | 3/2017 | Knox |
| 2017/0267331 | A1 | 9/2017 | Schultz |

OTHER PUBLICATIONS

Aurora Flight Sciences; Centaur Optionally-Piloted Aircraft brochure.
Day, Carole; Your (robot) captain speaking; The Australian Financial Review; Aug. 20, 2016.
Jeong, Heejin, et al.; A Robot-Machine Interface for Full-functionality Automation using a Humanoid; 2014 IEEE/RSJ International Conference on Intelligent Robots and Systems (IROS 2014); Sep. 14-18, 2014, Chicago, IL.
Markoff, John; A Machine in the Co-Pilot's Seat; The New York Times; Jul. 20, 2015.
International Search Report and Written Opinion, dated Jun. 21, 2017, in International application No. PCT/US2017/023523, filed Mar. 22, 2017.
The partial European search report in European application No. 18184925.8, dated Jan. 30, 2019.
Szondy, David: "DARPA robot lands (simulated) Boeing 737" (May 18, 2017), XP002787446, https://newatlas.com/darpa-robot-boeing-737-landing-simulator/49580/ [retrieved on Dec. 14, 2018].
Aurora Flight Sciences: "Robotic Co-Pilot Flies and Lands a Simulated Boeing 737" (May 16, 2017), XP054978975, https://www.youtube.com/watch?v=om18cOWFL3Q [retrieved on Dec. 14, 2018].
Aurora: "Alias Advanced Automation to Enable Reduced Crew Operations Aircrew Labor In-Cockpit Automation System Artist's Concept", (Oct. 15, 2016), XP055534900, http://www.aurora.aero/wp-content/uploads/2016/10/Alias-Brochure_X8.pdf [retrieved on Dec. 14, 2018].
"AI Just "Landed" a Boeing 737 for the First Time by Itself" (Jun. 28, 2017) https://bigthink.com/robby-berman/ai-just-landed-a-boeing-737-for-the-first-time-by-itself [retrieved on Dec. 3, 2018].
"Answer: Fly your plane; Question: Who or what is CARNAC?" (Jun. 22, 2017), https://www.therobotreport.com/answer-fly-your-plane-question-who-or-what-is-carnac/ [retrieved on Dec. 3, 2018].
"Inside Darpa's Plan to Make Old Aircraft Autonomous With Robot Arms" (Feb. 11, 2016), https://www.wired.com/2016/11/darpa-alias-autonomous-aircraft-aurora-sikorsky/ [retrieved on Dec. 3, 2018].
"Pilotless planes may be landing at airports by 2020" (Dec. 6, 2016), https://www.geo.tv/latest/122825-Pilotless-planes-may-be-landing-at-airports-by-2020 [retrieved on Dec. 3, 2018].
""Siri, Land the Plane"" (May 26, 2017), https://www.airspacemag.com/daily-planet/meet-your-new-copilot-robotic-arm-180963469/ [retrieved on Dec. 3, 2018].
Extended European search report, in European application No. 18184925.8, dated Apr. 30, 2019.

* cited by examiner

SYSTEM AND METHOD FOR PROVIDING IN-COCKPIT ACTUATION OF AIRCRAFT CONTROLS

TECHNICAL FIELD

The present disclosure relates to the field of flight control systems, methods, and apparatuses; even more particularly, to actuation systems for in-cockpit robot actuation of aircraft controls.

BACKGROUND

Recent experience with automation in cockpits has shown that prior approaches of adding additional functionality to flight decks increases complexity, causes overreliance on automation, and may not necessarily reduce workload; especially during critical situations. An additional challenge is that avionics manufacturers, in order to provide high reliability and verifiability, have instituted strict requirements-based design and change orders for any desired improvements. Thus, conversion of legacy aircraft is generally cost prohibitive and requires a large capital investment in requirements, verification, and testing.

Aurora Flight Sciences Corporation of Manassas, Va. has previously developed a right-seat pilot assistant capable of operating a Diamond DA42 Twin Star during takeoff, cruise, and landing. The right-seat pilot assistant, called Centaur, can be installed into, and removed from, the DA42 without affecting the original type certificate, thus maintaining the aircraft's original certification. Centaur includes mechanical actuation of the primary flight controls and its own avionics suite, and may be used with a pilot in a supervisory role or as a fully unmanned aircraft.

Despite recent advancements in in-cockpit robot automation, a challenge for existing in-cockpit robot automation systems is manipulation of more preexisting complex interfaces in the cockpit, such as a control display unit (CDU) of a flight management system (FMS), which is a fundamental component of most modern airliner's avionics. An FMS is a specialized computer system that automates a wide variety of in-flight tasks, reducing the workload on the flight crew to the point that modern civilian aircraft no longer carry flight engineers or navigators. A primary function of the FMS is in-flight management of the flight plan. Using various sensors (such as GPS and INS often backed up by radio navigation) to determine the aircraft's position, the FMS can guide the aircraft along the flight plan. From the cockpit, the FMS is normally controlled through the CDU, which incorporates a small screen and keyboard or touchscreen. The FMS sends the flight plan for display to the Electronic Flight Instrument System (EFIS), navigation display, or multifunction display.

Given the size of the FMS and its CDU (e.g., keyboard/touchscreen), it is difficult for existing robotic systems to accurately engage the FMS's CDU. In view of the forgoing, the subject disclosure provides a robot system and architecture for operating complex interfaces in the cockpit, such as the FMS.

SUMMARY OF THE INVENTION

The present disclosure is directed to flight control systems, methods, and apparatuses; even more particularly, to an automation system configured to, inter alia, operate complex interfaces in the cockpit, such as the FMS.

According to a first aspect, an actuation system to manipulate a control interface comprises: an actuation controller; a vision system operatively coupled to the actuation controller to optically image a display device of the control interface; a robotic arm assembly operatively coupled to the actuation controller to engage a user-actuable device of the control interface; a housing to affix to a surface adjacent the control interface, wherein each of the vision system and the robotic arm assembly are coupled to and supported by the housing, wherein actuation controller is configured to instruct the robotic arm assembly based at least in part on data from the vision system.

In certain aspects, the vision system includes an optical support arm and a camera mounted at an end of the optical support arm.

In certain aspects, the optical support arm is moveable and movement of the optical support arm relative to the housing is limited to a single degree of freedom.

In certain aspects, each of the vision system and the robotic arm assembly are configured to retract into a cavity defined by the housing.

In certain aspects, each of the vision system and the robotic arm assembly retract into the cavity when in a stowed position.

In certain aspects, the robotic arm assembly includes a robotic arm and a contact tip.

In certain aspects, the contact tip comprises a conductive fiber material.

In certain aspects, the robotic arm comprises two boom sections coupled end-to-end via a pivotal joint.

In certain aspects, the robotic arm is slideably coupled to the housing via a slideable arm support structure.

In certain aspects, each of the vision system and the robotic arm assembly are slideably coupled to the housing.

In certain aspects, the actuation controller is communicatively coupled with a human machine interface, the actuation controller being responsive to commands from the human machine interface.

In certain aspects, the human machine interface is a tablet computer.

In certain aspects, the actuation controller is communicatively coupled with a core platform that provides for communicating between an aircrew member and the actuation system.

In certain aspects, the core platform is communicatively coupled with a human machine interface to provide communicating between the aircrew member and the actuation system.

In certain aspects, the actuation controller is configured to instruct the robotic arm assembly to engage the user-actuable device in response to commands from a core platform.

In certain aspects, the vision system is configured to monitor operation of the robotic arm assembly visually.

In certain aspects, the actuation controller is configured to adjust operation of the robotic arm assembly to align a contact tip of the robotic arm assembly based at least in part on feedback from the vision system.

In certain aspects, the preexisting interface is a preexisting control display unit that is operatively coupled with a preexisting flight management system.

In certain aspects, the vision system is configured to provide a field of view of about at least 180 degrees.

According to a second aspect, in an actuation system comprising an actuation controller, a vision system, a robotic arm assembly, and a housing, a method for manipulating a control interface comprises: optically imaging a display device of the control interface via the vision system; engaging, via the robotic arm assembly, a user-actuable device of the control interface based at least in part on information from the vision system, wherein the robotic arm assembly and the vision system are each operatively coupled to the actuation controller, and wherein each of the vision system and the robotic arm assembly are coupled to and supported by a housing that is affixed to a surface adjacent the control interface; and instructing, via the actuation controller, the robotic arm assembly to actuate the user-actuable device based at least in part on data from the vision system.

In certain aspects, the vision system includes an optical support arm and a camera mounted at an end of the optical support arm.

In certain aspects, the optical support arm is moveable and movement of the optical support arm relative to the housing is limited to a single degree of freedom.

In certain aspects, the method further comprises the step of retracting each of the vision system and the robotic arm assembly into a cavity defined by the housing.

In certain aspects, each of the vision system and the robotic arm assembly retract into the cavity when in a stowed position.

In certain aspects, the robotic arm assembly includes a robotic arm and a contact tip.

In certain aspects, the contact tip comprises a conductive fiber material.

In certain aspects, the robotic arm comprises two boom sections coupled end-to-end via a pivotal joint.

In certain aspects, the robotic arm is slideably coupled to the housing via a slideable arm support structure.

In certain aspects, each of the vision system and the robotic arm assembly are slideably coupled to the housing.

In certain aspects, the actuation controller is communicatively coupled with a human machine interface, the actuation controller being responsive to commands from the human machine interface.

In certain aspects, the human machine interface is a tablet computer.

In certain aspects, the actuation controller is communicatively coupled with a core platform that provides for communicating between an aircrew member and the actuation system.

In certain aspects, the core platform is communicatively coupled with a human machine interface to provide communicating between the aircrew member and the actuation system.

In certain aspects, the method further comprises the step of instructing, via the actuation controller, the robotic arm assembly to engage the user-actuable device in response to commands.

In certain aspects, the vision system is configured to monitor operation of the robotic arm assembly visually.

In certain aspects, the method further comprises the step of adjusting an operation of the robotic arm assembly to align the contact tip based at least in part on feedback from the vision system.

In certain aspects, the control interface is a preexisting control display unit that is operatively coupled with a preexisting flight management system.

In certain aspects, the vision system is configured to provide a field of view of about at least 180 degrees.

DESCRIPTION OF THE DRAWINGS

These and other advantages of the present disclosure may be readily understood with the reference to the following specifications and attached drawings wherein:

FIG. 1b illustrates an example flow of information data between the subsystems of FIG. 1a.

DETAILED DESCRIPTION

Figure 1A:
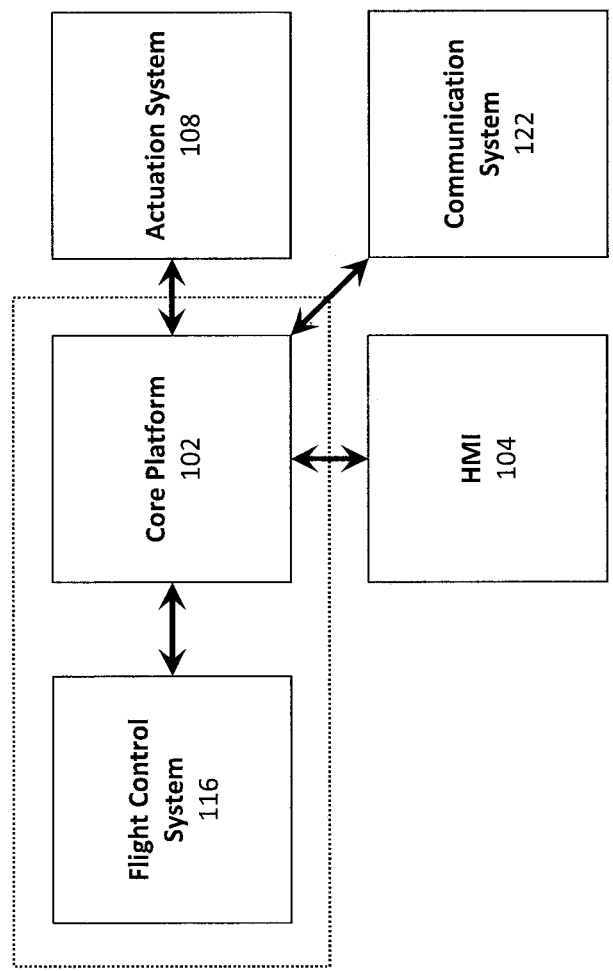
FIG. 1a illustrates a block diagram of an example automation system.

Preferred embodiments of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As used herein, the words "about" and "approximately," when used to modify or describe a value (or range of values), mean reasonably close to that value or range of values. Thus, the embodiments described herein are not limited to only the recited values and ranges of values, but rather should include reasonably workable deviations. As utilized herein, circuitry or a device is "operable" to perform a function whenever the circuitry or device comprises the necessary hardware and code (if any is necessary) to perform the function, regardless of whether performance of the function is disabled, or not enabled (e.g., by a user-configurable setting, factory trim, etc.).

As used herein, the terms "aerial vehicle" and "aircraft" refer to a machine capable of flight, including, but not limited to, both traditional runway and vertical takeoff and landing ("VTOL") aircraft. VTOL aircraft may include fixed-wing aircraft (e.g., Harrier jets), rotorcraft (e.g., helicopters), and/or tilt-rotor/tilt-wing aircraft.

As utilized herein, "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

As used herein, the terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination. The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list, or data presented in any other form.

As utilized herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code.

The term "database" as used herein means an organized body of related data, regardless of the manner in which the data or the organized body thereof is represented. For example, the organized body of related data may be in the form of one or more of a table, map, grid, packet, datagram, frame, file, email, message, document, report, list, or in any other form.

The term "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

The term "memory device" means computer hardware or circuitry to store information for use by a processor. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "network" as used herein includes both networks and inter-networks of all kinds, including the Internet, and is not limited to any particular network or inter-network.

The term "processor" means processing devices, apparatuses, programs, circuits, components, systems, and subsystems, whether implemented in hardware, tangibly embodied software, or both, and whether or not it is programmable. The term "processor" includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with, a memory device.

Disclosed herein is an automation system configured to, inter alia, operate an aircraft's flight controllers and to provide real-time information and/or feedback to the pilot. The automation system may be configured to operate as an assistant to a pilot or as the pilot, for example, in the event of pilot incapacitation or failure. In conjunction with an actuation system, the automation system may further take control of the aircraft and autonomously navigate the aircraft by controlling its flight controls, including the primary controls, the secondary controls, and more tertiary controls, including more complex interfaces in the cockpit, such as the preexisting flight management system's (FMS) preexisting control display unit (CDU). To that end, the automation system may further perform, or supervise, an automatic descent and land procedure in an aircraft—such may be the case in an emergency situation. This automation system may communicate its state of operation and any perceived deviations from an expected aircraft state to the pilot or an airport control tower.

Unlike existing robotic autopilots and pilot assist systems, which are invasive to the aircraft, require considerable installation expertise, and are aircraft-specific; an automation system in accordance with an aspect of the present disclosure enables rapid non-invasive installation, which facilitates widespread use and enables the automation system to be quickly adapted for use in a variety of aircraft. Further, the automation system's core platform and flight control actuation systems enable portability across a variety of aircraft. Thus, unlike existing robotic autopilots or pilot assist systems, the automation system may be temporarily installed and readily transferred from aircraft to aircraft, without invasive modification to the aircraft. The automation system, through its modular design, further reduces the likelihood of designing a single point solution that becomes obsolete as aircraft evolve. While the automation system may be non-invasively installed, the automation system may be integral and permanently installed during fabrication of the aircraft.

System Level Architecture.

Figure 1B:
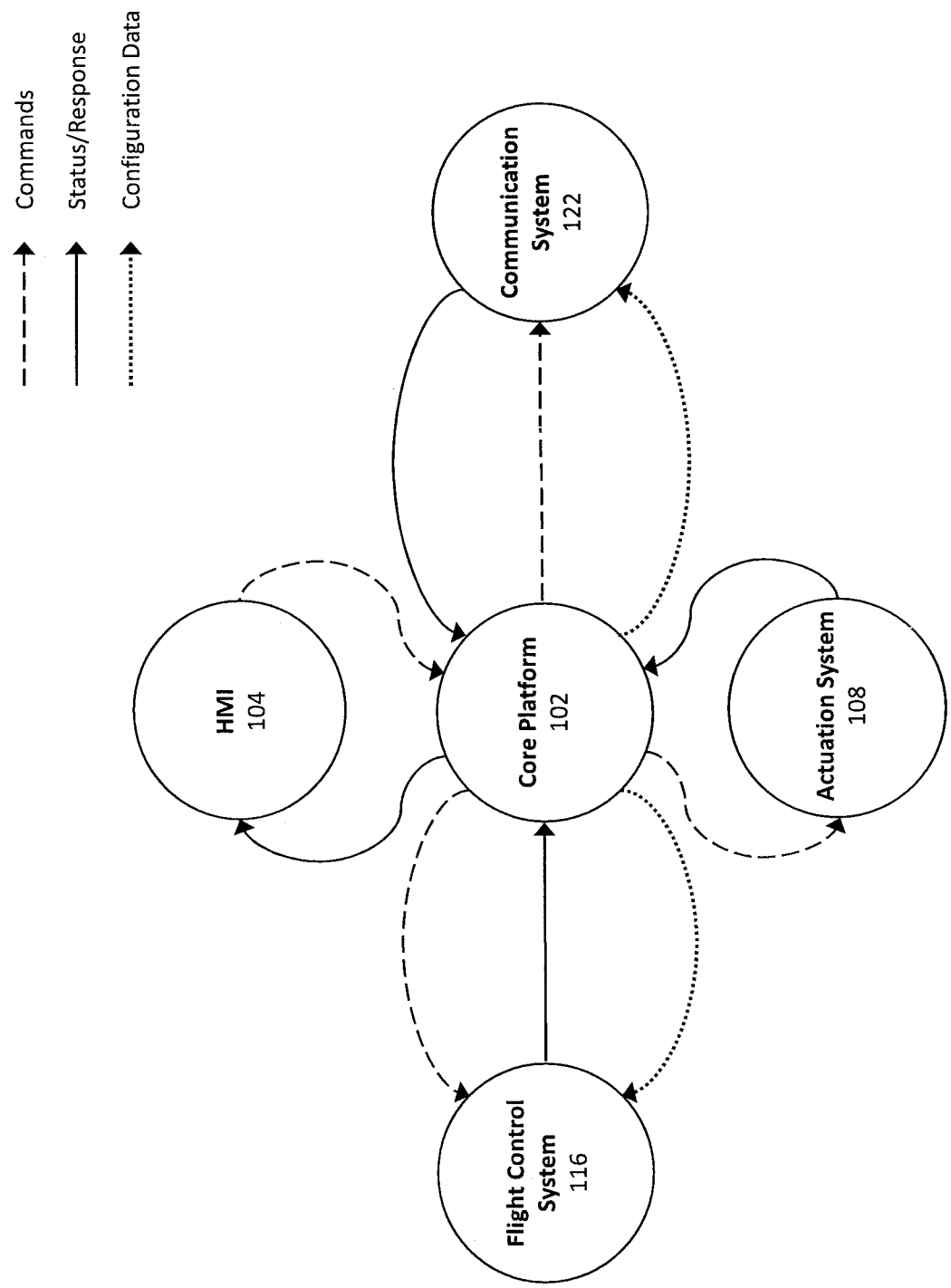
Figure 1C:
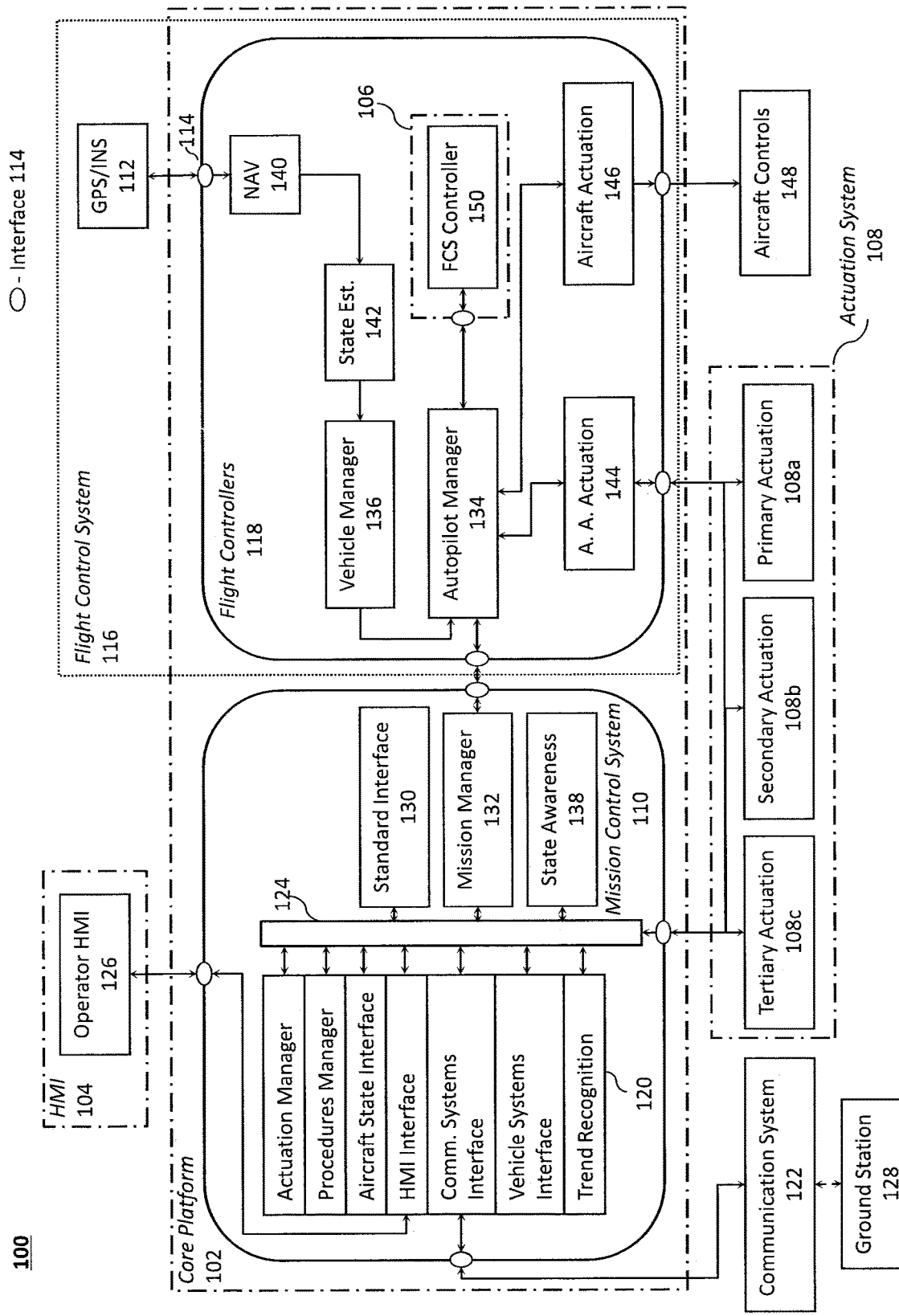
FIG. 1c illustrates a block diagram of an example core platform.

An example system architecture for an automation system 100 in accordance with one aspect is shown in FIGS. 1*a* through 1*c*. As illustrated in FIG. 1*a*, the core platform 102 may operate as a central subsystem that connects the other subsystems via one or more interfaces. The subsystems may communicate with one another through software and/or hardware interfaces 114 using wired and/or wireless communication protocols and hardware. FIG. 1*b* illustrates an example flow of information (e.g., data) between the various subsystems.

The automation system 100 may comprise a core platform 102 operatively coupled with a plurality of subsystems. Each of the plurality of subsystems of the automation system 100 may be modular, such that the entire automation system 100 can be disconnected and substantially ported to another aircraft rapidly. For example, the various subsystems may be removably and communicatively coupled to one another via the core platform 102 using one or more software and/or hardware interfaces 114. In certain aspects, however, the automation system 100 may alternatively be integral with the aircraft's system, thereby directly employing all sensors and indicators in the airplane. For example, the automation system 100, or components thereof, may be integrated into the aircraft during its design and manufacturing.

As illustrated, the plurality of subsystems may include, inter alia, an actuation system 108, a human machine interface ("HMI") system 104, a flight control system 116, and a communication system 122; each of which may be operatively coupled with the core platform 102. In certain aspects, the core platform 102 may be further coupled with other subsystems, such as an aircraft state monitoring system (which may include a perception system to visually monitor the cockpit instruments), a knowledge acquisition system, an aircrew-health monitoring system, etc. For example, the aircraft state monitoring system may be used to collect, determine, or otherwise perceive the real-time aircraft state. The aircraft state monitoring system may perceive the real-time aircraft state through, inter alia, a direct connection (e.g., integral with or otherwise hardwired to the aircraft) to the aircraft, or via perception system. Where applicable, a perception system, for example, may employ a combination of an optical/vision system, an acoustic system, and one or more identification algorithms to read or comprehend flight situation information displayed by cockpit instruments (as captured by, for example, the optical/vision system). Example cockpit instruments include, for example, an altimeter, an airspeed indicator, a vertical speed indicator, one or more compass systems (e.g., a magnetic compass), one or more gyroscopic systems (e.g., attitude indicator, heading indicator, turn indicator), one or more flight director systems, one or more navigational systems (e.g., very-high frequency omnidirectional range (VOR), non-directional radio beacon (NDB)), an instrument landing system (e.g., glide scope), etc. By way of illustration, the perception system may include a processor and one or more optical sensors (e.g., three or more lightweight machine vision cameras) trained on the instrument panel to maximize pixel density, glare robustness, and redundancy. The one or more optical sensors may wiredly connect to the perception computer via, for example, Ethernet. The one or more optical sensors should be installed with a line of sight with the instrument panel, but so as to be not obstructive to the pilot. The aircraft state monitoring system, and other exemplary subsystems, are described in greater details by commonly owned U.S. patent application Ser. No. 15/624,139 to William Bosworth et al., which was filed on Jun. 15, 2017 and is titled "System and Method for Performing an Emergency Descent and Landing."

The modular configuration further enables the operator to remove/disable unnecessary systems or modules or to add/install additional systems or modules. For example, if the automation system 100 is configured to provide only information to the pilot via the HMI system 104 (i.e., without the ability to control the aircraft), the actuation system 108 (or portions thereof) may be removed or disabled to reduce weight, cost, and/or power consumption. Accordingly, depending on the configuration, the automation system 100 may be configured with fewer or additional modules, components, or systems without departing from the spirit and scope of the disclosure.

In operation, the flight control system 116 derives the pilot and aircraft state based on information data from the aircraft, pilot, or another subsystem (e.g., an aircraft state monitoring system or a perception system) and directs another subsystem (e.g., the actuation system 108) to operate (e.g., dynamically—in real-time or near real-time) in a manner to maintain aircraft stability. For example, the flight control system 116 may receive vehicle mode commands and configuration data from the core platform 102, while sending to the core platform 102 status and command information generated by the flight control system 116. Indeed, the core platform may be configured to communicate one or more commands to the flight control system 116 of the aircraft based at least in part on the flight situation data, which may be obtained from an aircraft state monitoring system, a perception system, a pilot, or a combination thereof.

The flight control system 116 may include, or communicate with, existing flight control devices or systems, such as those used in fixed wing aircraft and rotary wing aircraft. The communication system 122 enables the automation system 100 to communicate with other devices (including remote or distant devices) via, for example, a network. The communication system 122 may receive communication commands and configuration data from the core platform 102, while sending to the core platform 102 status and response information from the communication system 122.

Core Platform 102.

To enable a vehicle-agnostic automation system 100, a core platform 102 may provide, or otherwise serve as, middleware that can be made specific to a particular aircraft or configuration through an initial transition and setup phase. In other words, the mission control system 110 may host an operating system that provides services to a set of operational applications and output signals to one or more of a set of hardware interfaces or the HMI system 104, while collecting and logging the data necessary to enable those applications.

In one aspect, the core platform 102 serves as the primary autonomous agent and decision-maker, which can then synthesize inputs with any acquired knowledge base to determine the overall system state. The core platform 102 may employ a processor, or other controller, to process the inputs from the various sensor suites or subsystems and aggregate the resultant information into an understanding of current aircraft state. The resultant information may be compared against an aircraft specific file that encompasses the automation system's 100 understanding of pilot intent, system health, and understanding of appropriate aircraft procedures as they relate to the automation system's 100 state estimation. The resultant state knowledge and associated recommendations can be passed to a human pilot via the HMI system 104 or, in certain aspects, to the flight control system 116 and/or actuation system 108 to enable autonomous operation. The automation system 100 may further generate a log of a given flight for later analysis, which may be used to facilitate pilot training that can provide detailed training and operations flight debriefs. The logs may be used in connection with, for example, flight operational quality assurance analysis, maintenance analysis, etc.

As illustrated in FIG. 1c, the core platform 102 may include a mission control system 110 and flight controllers 118, each of which are configured to communicate with one another and the other subsystems via one or more software and/or hardware interfaces 114, which may be a combination of hardware (e.g., permanent or removable connectors) and software. The core platform 102 can host various software processes that track the aircraft and procedure states, as well as any modules for trend analytics (predictive warnings) and machine learning routines. In certain aspects, the automation system 100 and/or core platform 102 may employ a computer bus and specification (e.g., as an interface) that facilitates discovery of a hardware component of a subsystem within the automation system 100 without the need for physical device configuration or user intervention in resolving resource conflicts. Such a configuration may be referred to as "plug-and-play." Thus, a user may readily add or remove system or subsystems (e.g., as modules) to the automation system 100 via the core platform 102 without requiring substantive modification or integration efforts.

The core platform 102 outputs may be used to provide messages to the HMI system 104. The messages may indicate, for example, checklist progress, contingencies to initiate, warnings to raise, aircrew (e.g., pilot) health status, etc. The core platform 102 may also contain a flight data recorder, for instance to provide performance review capability and to provide robustness against in-flight reset. The hardware and various computers may also be ruggedized and share a housing with other devices, such as a controller. For example, the hardware and various computers may be ruggedized using improved wiring/connectors to pervert shorts and/or power or signal loss, thermal management, stronger mechanical structures, redundant components, and the like, which make the hardware and software tolerant to environmental conditions of the aircraft (e.g., vibration, temperature, pressure, etc.). As discussed below, the core platform 102 may be operatively coupled with a global positioning system ("GPS")/inertial navigation system ("INS") system 112 and power management system (e.g., 28 VDC power). The core platform 102 may also contain a flight data recorder, for instance to provide performance review capability and to provide robustness against in-flight reset.

The mission control system 110 generally comprises a mission manager 132, a standard interface 130 (e.g., a STANAG interface), a state awareness manager 138, and other operational components 120 (e.g., hardware and software controllers and/or interfaces), each of which are communicatively coupled to one another via one or more data buses 124. Other operational components 120 may include, for example, an actuation manager operational component, a procedures manager operational component, an aircraft state operational component, an HMI operational component, a vehicle systems operational component, and a trend recognition operational component. The open architecture of the core platform 102 enables the incorporation of additional data received from systems via the data bus 124. In certain aspects, the mission control system 110 may be coupled with one or more cockpit instruments of the aircraft via the vehicle systems interface to collect flight situation data. In other aspects, the mission control system 110 may collect flight situation data through an aircraft state interface via an aircraft state monitoring system, which may collect or generate flight situation data via a direct connection to the aircraft and/or a perception system. For example, flight situation data perceived by the perception system may be encoded and provided to the core platform 102 in real-time. The open architecture of the core platform 102 enables the incorporation of additional data received via a data bus 124 to augment the flight situation data generated by the perception system.

As illustrated, the mission control system 110 may be operably coupled with the an actuation system 108 (e.g., when fully autonomous or partial autonomous operation is desired), and the HMI system 104, including the human-machine interface 126 (e.g., software and/or hardware that conveys inputs from and displays information to the pilot), and ground station 128. The actuation system 108, depending on the type of flight controllers to be controlled, may include a primary actuation system 108a, a secondary actuation system 108b, and/or a tertiary actuation system 108c. In certain aspects, the mission control system 110 may control the secondary actuation system 108b and/or the tertiary actuation system 108c. The mission control system 110 may communicate with the flight controllers 118 via the mission manager 132. The flight controllers 118 may include, for example, an autopilot manager 134 and a vehicle manager 136. The vehicle manager 136 may be generally responsible for navigation and determining the location and state of the aircraft. The vehicle manager 136 may be coupled with a state estimation module 142, which determines the estimated state of the aircraft using information received from the GPS/INS system 112 via a navigation module 140 and, where available, from the perception system via a perception module.

The autopilot manager 134 may be generally responsible for controlling the aircraft's flight based on, for example, information received from the vehicle manager 136 and the mission control system 110. The autopilot manager 134 controls, inter alia, the flight control system 106, which may be new or preexisting (and comprises a flight controller 150), as well as the aircrew automation actuation module 144 and the aircraft actuation module 146. The aircrew automation actuation module 144 may be operatively coupled with the actuation system 108. For example, the aircrew automation actuation module 144 may control the primary actuation system 108a, while the aircraft actuation module 146 may control the aircraft controls 148 (e.g., various flight surfaces and actuators).

In certain aspects, as better illustrated in FIG. 1c, the core platform 102 and the flight control system 116 may share, or overlap in terms of, components and/or functionality. For example, the flight controller's 118 components may overlap with certain components of the flight control system 116. Therefore, in certain aspects (e.g., where redundancy is not desired and non-invasive integration is possible), the core platform 102 may exploit certain existing aircraft software and/or hardware, thereby obviating the need for additional hardware, such as certain flight controller 118 components and/or a GPS/INS system 112.

Open Architecture.

The core platform 102 serves as the central subsystem, or interface, of the automation system 100, connecting and controlling the remaining subsystems (e.g., as individual applications) in an open architecture. The remaining subsystems include, for instance, the flight control system 116 (including any flight plan capabilities), the HMI system 104, the actuation systems 108 (e.g., the primary, secondary, or tertiary), and other subsystems. Thus, control of the other automation system 100 hardware may be provided via separate applications specific to a particular piece of hardware, which enables rapid integration of new systems or other external flight plan support technology.

The core platform's 102 architecture enables rapid portability and extensibility when transitioning to a new aircraft or incorporating a new flight plan feature/capability. Thus, an application may be used to enable the automation system 100 to acquire information specific, or otherwise needed, for that aircraft or to provide the new capability. For example, transition and setup can be handled by individual applications that operate within the core platform 102 or other subsystems, representing aircraft-specific functionalities as well as a growing library of capabilities of automation system 100, which can be exchanged depending on flight plan, aircraft or crew requirements. In certain aspects, the transition process may be supported by software applications external to the automation system 100 (such as a procedure editor).

Human/Machine Interface (HMI) System 104.

The HMI system 104 provides a control and communication interface (i.e., a user interface) for the pilot (e.g., a human pilot, whether on-board or remote). The HMI system 104 is configurable to operate as a flight plan manager that enables the pilot to direct the automation system 100. The HMI system 104 can combine elements of glass cockpits, unmanned aerial vehicle ("UAV") ground stations, and electronic flight bags (EFB) to enable effective, efficient, and latency-tolerant communication between the pilot and automation system 100. Generally speaking, an EFB is an electronic information management device that allows flight crews to perform a variety of functions that were traditionally accomplished by using paper references. The HMI system 104 may include a human-machine interface 126, which may be based on a touch screen graphical user interface ("GUI") and/or speech-recognition systems. The human-machine interface 126 may employ, for example, a tablet computer, a laptop computer, a smart phone, head mounted display, or combination thereof. The human-machine interface 126 can be secured near the pilot (e.g., on the yoke—as checklists often are, or on a knee-strap) depending on pilot preferences. The human-machine interface 126 may be removable coupled to the cockpit or, in certain aspect, employ an integrated display within the cockpit (e.g., an existing display).

The HMI system 104 serves as a primary channel of communication between the pilot and the automation system 100, enabling the pilot to command tasks to and receive feedback or instructions from the automation system 100, to change the allocation of tasks between pilot and automation system 100, and to select which operational applications are currently enabled for the automation system 100. As illustrated in FIG. 1*b*, for example, the HMI system 104 may receive status information from a subsystem via the core platform 102, while sending to the core platform 102 mode commands generated by the HMI system 104 or input by the pilot. The pilot may be remote (e.g., on the ground or in another aircraft) or on-board (i.e., in the aircraft). Thus, in certain aspects, the HMI system 104 may be remotely facilitated over a network via communication system 122.

Human-Machine Interface 126.

The human-machine interface 126 may employ a tablet based GUI and a speech-recognition interface that enables vocal communications. An objective of the human-machine interface 126 is to enable the pilot to interact with the core platform 102's knowledge base in manner akin to the way a pilot interacts with a human flight engineer or copilot. The human-machine interface 126 can display, via a display device (e.g., a liquid crystal display (LCD)), the current state of automation system 100 (its current settings and responsibilities) as well as which operational applications are currently installed, which operational applications are running and, if they are active, which actions the operational applications are taking. The human-machine interface's 126 GUI display may also be night-vision goggles compatible such that it is visible regardless of the pilot's eyewear. The speech-recognition system may be used to replicate the same types of verbal communications used by human aircrew when running through checklists and communicating on the flight deck. In certain aspects, the speech recognition may be limited to the same standards of codified communications used by pilot teams to minimize the chances of the system failing to recognize commands or changing into inappropriate modes of operations. The speech-recognition system may be configured to learn/recognize the speech of a given pilot through a voice training protocol. For example, the pilot may speak a predetermined script such that the speech-recognition system can become trained with the pilot's dialect.

The human-machine interface 126 may communicate the status and/or details of various operations, including the entire automation system 100 via the aircrew automation status application 302, the perception system via the perception status application 304, the autopilot via the autopilot status application 306 (where applicable), the GPS/INS system 112 via the GPS status application, and any other application or system status information 310. The display device of the human-machine interface 126 may be customized by the pilot. For example, the pilot may wish to add, reorganize, or remove certain of the display icons and/or operational applications, which may be accomplished through a select and drag maneuver or through the aircrew automation settings application 312. The human-machine interface 126 may further inform the pilot regarding the aircraft's operating status and to provide the pilot with instructions or advice.

Task Allocation.

The HMI system 104 can enable the pilot to limit the activities executed by the automation system 100, if any. The HMI system 104 may define the allocation of tasks between the pilot and automation system 100, their responsibilities, and the communication of information between the two, thereby functioning as a collaborative teammate of the pilot. Thus, the automation system 100 may operate, depending on configuration, in a purely advisory role (i.e., without any control over the aircraft), a fully autonomous role (i.e., controlling the flight control without pilot intervention), or an advisory role with the ability to control flight controllers (e.g., via the primary, secondary, and tertiary actuation systems 108*a*, 108*b*, 108*c*). The HMI system 104 may be further designed to enable a pilot to go through a transitional phase, where the pilot specifies the aspects of flight operation for which the automation system 100 is responsible. For example, the HMI system 104 may display a list of tasks where the pilot may select whether the automation system 100 or the pilot is responsible for a given task on the list. The list of tasks may be provided to the HMI system 104 from a procedure editor. Once the aircraft data structure has been populated and refined such that the pilot better trusts the automation system 100, the pilot may allow automation system 100 to perform additional actions, transitioning the pilot from a primary mode to a supervisory mode (i.e., a fully autonomous role). In this supervisory mode, pilot interactions may be at a high, goal-based level, with the HMI system 104 supporting those tasks as well as allowing the operator insight at other levels for troubleshooting. As noted above, in certain aspects, all tasks may be performed by the pilot, leaving the automation system 100 to serve an advisory role.

Mode Awareness.

A risk when employing any automation system is the potential for mode confusion on the part of the pilot (e.g., where the pilot neglects a task believing that the automation system will handle the task). The HMI system 104 avoids such mode confusion by first generating the correct function and the above-described task allocation between the automation system 100 and the pilot. Indeed, the HMI system 104 allows the pilot to directly command and configure automation system 100 via the human-machine interface 126 and displays the information necessary for the pilot to understand what actions the automation system 100 is taking to ensure mode awareness. In other words, mode awareness generally refers to a state where the mode of the system matches the operational mode expected by the operator. The human-machine interface 126 may display the information necessary to ensure that the pilot is always aware of the mode in which automation system 100 is operating. Additionally, the HMI system 104 serves as the human interface for individual mission applications (e.g., operational applications).

Actuation System 108.

The actuation system 108 is used to manipulate flight controls to execute the actions commanded via the core platform 102 to guide the flight and overall operation of the aircraft. The automation system's 100 actuation system 108 executes the actions commanded by the core platform 102 to guide the flight and overall operation of the aircraft without interfering with the activities performed by the pilot. As illustrated in FIG. 1*b*, for example, the actuation system 108 may receive actuation commands and configuration data from the core platform 102, while sending to the core platform 102 status and response information generated by the actuation system 108 (e.g., as feedback).

Manned aircraft cockpits are designed for the human reach envelope and, therefore, all cockpit controls are reachable by a comparably sized robotic/mechanical manipulator. A manipulator capable of actuating every single switch, knob, lever, and button on every single possible cockpit in high-G and vibration environments with the rapid execution required for emergency operation, however, would be expensive, heavy, and more invasive than what is desired for the automation system 100.

To more effectively achieve portability across aircraft, the automation system 100 may separate the actuation of primary flight controls (stick/yoke, stick, side-stick or collective, rudder pedals, brakes, and throttles) from the actuation of secondary flight controls (e.g., switches, knobs, rockers, fuses, etc.) and the tertiary flight controls—the more complex interfaces in the cockpit, such as the FMS and its CDU. This approach reduces the likelihood of designing a single point solution that becomes obsolete as aircraft evolve. Thus, the automation system 100 may employ a primary actuation system 108a, a secondary actuation system 108b, and a tertiary actuation system 108c to physically control the various flight controls and actuators in the cockpit. More specifically, the primary actuation system 108a may actuate the primary flight controls, while the secondary actuation system 108b may actuate the secondary flight controls and the tertiary actuation system 108c operates the more complex interfaces in the cockpit, such as the CDU, each without obscuring the use of those controls by the pilot.

The actuation system 108 can be configured to actuate all standard controls present on today's flight decks during flight operations. For example, as discussed below, the primary actuation system 108a focuses on actuating the primary flight controls (stick/yoke, stick, side-stick or collective, rudder pedals, breaks and throttles), while the secondary actuation system 108b focuses on actuating the controls that are not as easily accessed by the primary actuation system 108a, such as secondary flight controls (e.g., switches, knobs, rockers, fuses, etc.) and the tertiary actuation system 108c operates the tertiary flight controls, which typically exhibit more complex interfaces, such as keypads, small buttons, and other user-actuable devices.

Primary Actuation System 108a.

Figure 2A:
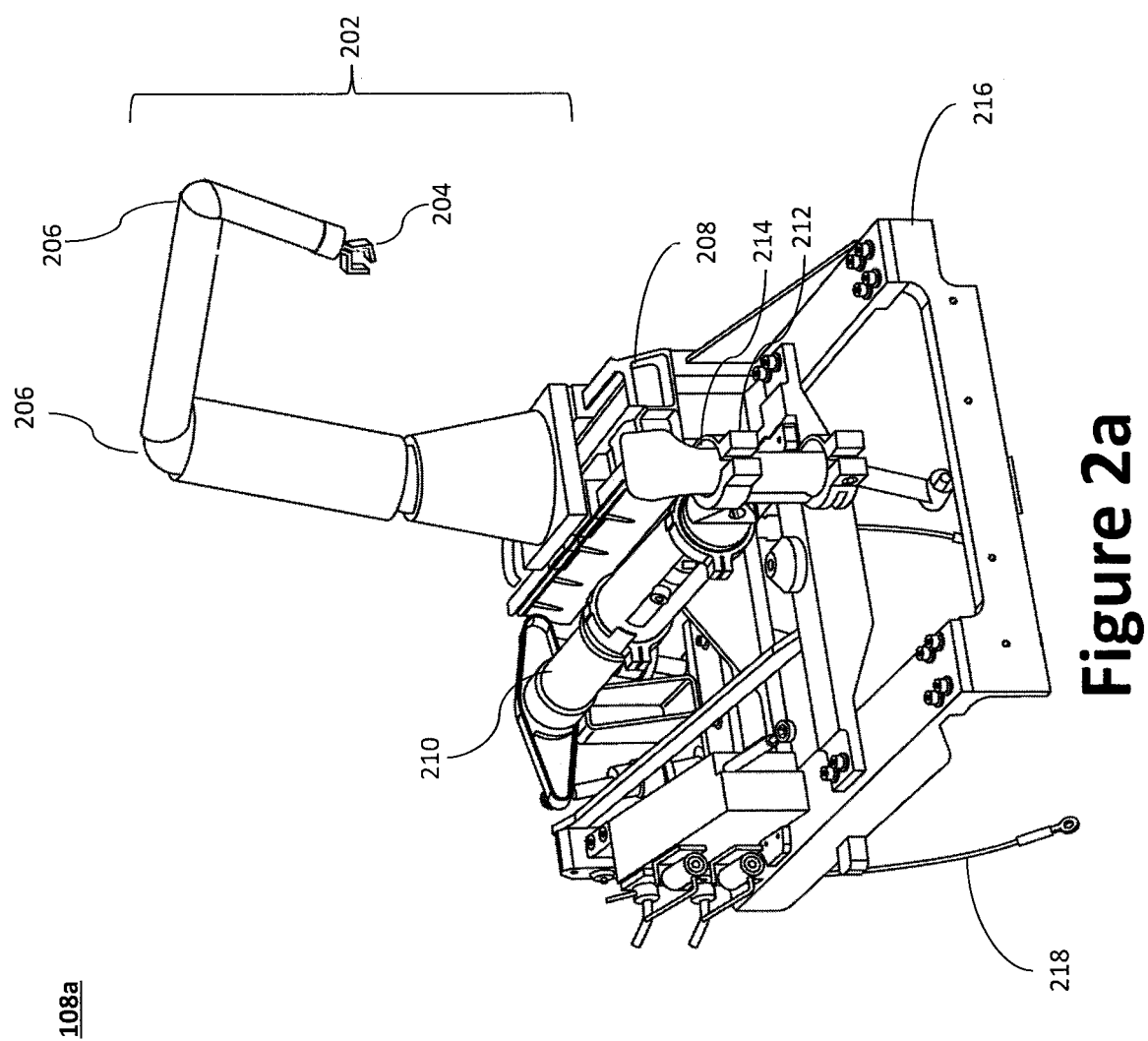
FIGS. 2a and 2b illustrate an example primary actuation system.
Figure 2B:
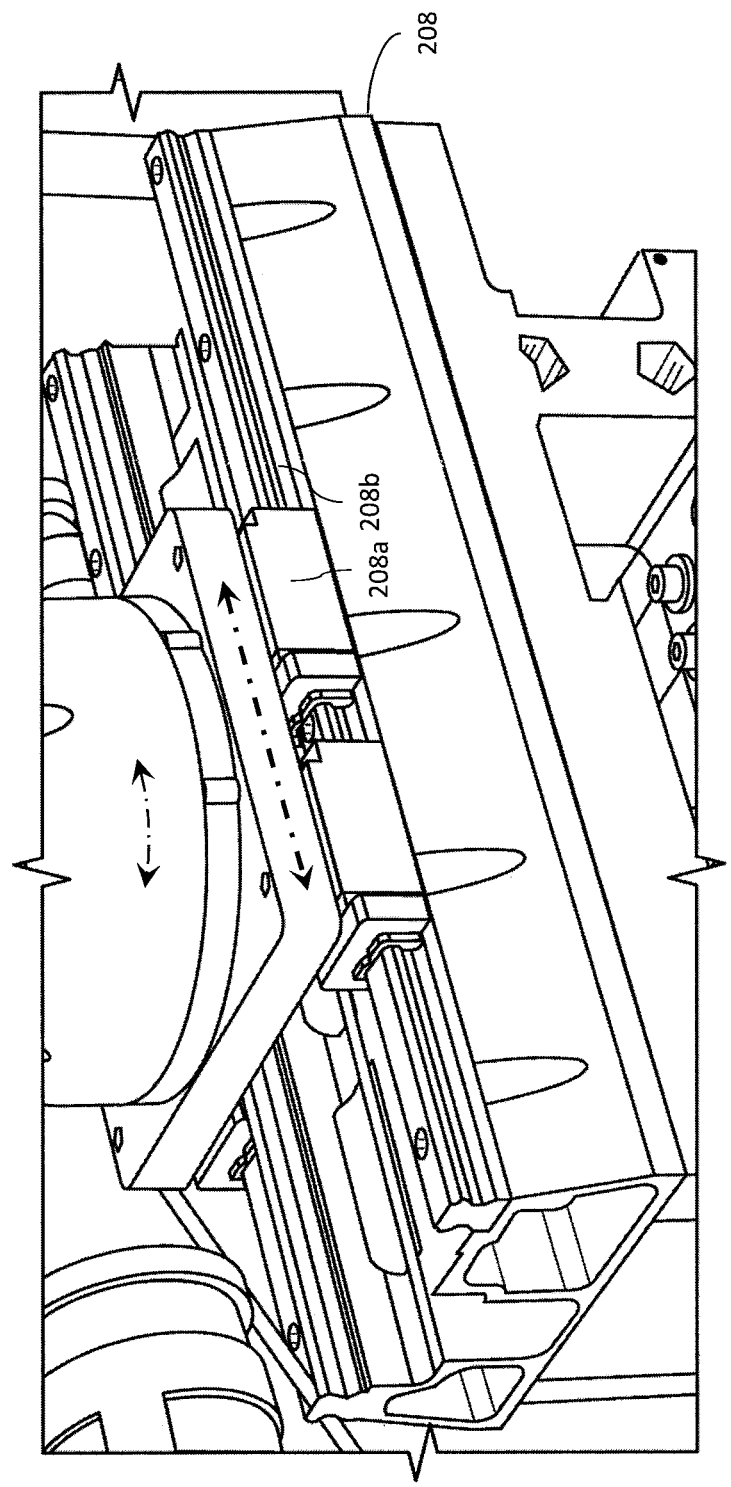

The primary actuation system 108a focuses on the set of controls necessary to safely operate the aircraft. As shown in FIGS. 2a and 2b, primary actuation system 108a include a frame 216 having an articulating arm 202 (e.g., a robotic appendage or "arm") and stick/yoke actuator 210 that actuates the primary flight controls (yoke, stick, side-stick or collective, rudder pedals, brakes, and throttles) and other, easy to reach controls. The actuators may be one or more of linear (straight line), rotary (circular), or oscillatory actuators, which may be driven through one or more of electrical, pneumatic, and/or hydraulic techniques. The frame 216 may be sized and shaped to fit within the seat of a standard aircraft (effectively replacing a human pilot). To that end, the frame's 216 footprint should be about the same size as, or smaller than, an average human's "seated" footprint. The actuation system 108 may be fabricated using lightweight metals, metal alloys, and/or composite materials.

Stick/Yoke Actuator 210.

The stick/yoke actuator 210 may couple to and engage the aircraft's existing stick/yoke 214 using a stick/yoke gripper 212. The stick/yoke gripper 212 may be sized and shaped such that it is universal and can engage various forms of stick/yokes and/or control wheels. The stick/yoke actuator 210 may be configured to move the stick/yoke 214 forward, backward, left, right, and intermediate positions therebetween. The stick/yoke gripper 212 may further comprise one or more actuators for actuating buttons and/or switches positioned on the stick/yoke 214.

Articulating Arm 202.

The actuator-controlled articulating arm 202 may be sized, shaped, and configured to occupy the space typically occupied by a co-pilot's arms, thereby ensuring portability across aircraft. To enable movement in multiple degrees of freedom ("DOF") movement, the articulating arm 202 may comprise a plurality of arm segments (whether linear, curved, or angled) joined using a plurality of hinged or pivotal joints 206. The articulating arm 202 may comprise a gripper 204 at its distal end. The gripper 204 may be coupled to the articulating arm 202 via a multiple-DOF connection. The base (proximal) end of the articulating arm 202 may be rotatable and slideably coupled to the frame 216 via a movable base 208. For example, the articulating arm 202 may be coupled with an upper base 208a, which is slideably coupled with a lower base 208b, which may be secured to the frame 216. The upper base 208a may slide relative to the lower base 208b using, for example, a combination of rails and ball bearings. In certain aspects, the upper base 208a may slide relative to the lower base 208b along both the X- and Y-axis.

The articulating arm 202 can be equipped with an encoder (e.g., an 18-bit single-revolution rotational encoder) for each of its degrees of freedom to ensure exact positioning of the articulating arm 202. The encoders can be mounted at the motor, or at the joint itself (e.g., down-stream of any gearbox or other linkage). Internal clutches may be provided at each hinged or pivotal joint 206 such that the articulating arm 202 can be overpowered by the pilot if so desired, without damaging the articulating arm 202. In such a case, the automation system 100 may determine the position or location of the articulating arm 202 using the encoders.

The gripper 204 may be configured to couple, or otherwise engage, for example, throttle levers, etc. The gripper 204 may also provide force and pressure detection so as to allow the automation system 100 to estimate how a flight controls actuator is grasped and to adjust the motion to properly manipulate it. Once the motion is executed, the same feedback may be used to determine if the desired switch configuration has been achieved. In certain aspects, the articulating arm 202 may be fitted with an electronic device (e.g., a homing device) that enables it to find and hit a target.

Secondary Actuation System 108b.

Unlike the primary flight controls, which are generally located in the same vicinity across aircraft makes and types, the location of the secondary flight controls (e.g., avionics, switches, knobs, rockers, toggles, covered switches, fuses, etc.) is not as consistent or spatially contained from aircraft to aircraft.

The secondary actuation system 108b focuses on actuating the controls that are not as easily accessed by the primary actuation system 108a. For example, some switches may even be on an overhead panel directly above the captain's head, making it potentially difficult to manipulate them with the articulating arm 202 (especially in turbulent flight conditions). Accordingly, some actuators may be allocated to the above described primary actuation system 108a, while others may be allocated to a self-contained, secondary actuation system 108b.

Figure 3:
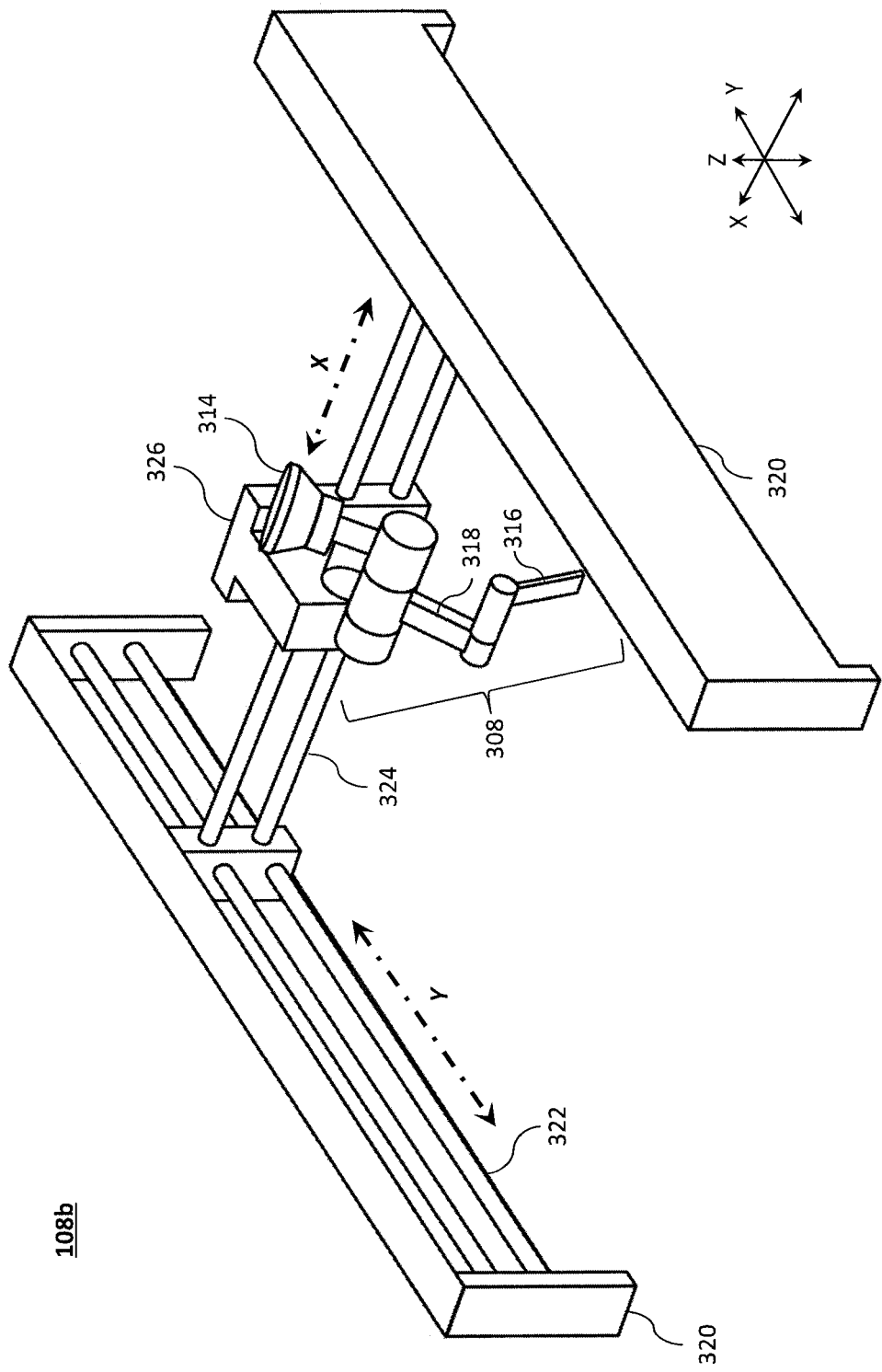
FIG. 3 illustrates an example secondary actuation system.

The secondary actuation system 108b may be provided in the form of an adaptable XY-plotter or gantry system mounted directly to the panel of interest and calibrated to the specific panel it is operating. The secondary actuation system 108b is preferably universal and resizable. An example XY-plotter is illustrated in FIG. 3. The XY-plotter may comprise a square frame that serves as the rails 320 of the plotter, a rotatable multi-tool 308 with multiple contact interfaces (e.g., switch actuator 316 and knob actuator 314) capable of manipulating the controls of interest, and a control system that moves this multi-tool carriage 326 within the frame along a Y-axis set of rails 322 and an X-axis set of rails 324.

When in use, the plotter moves the multi-tool 308 to the location, selects the correct manipulator interface, and manipulates the secondary flight control of interest. For example, the multi-tool 308 that can flip binary switches and/or covered switches using a switch actuator 316 and can twist knobs using a knob actuator 314. The switch actuator 316 and/or knob actuator 314 may be coupled to the multi-tool 308 via an articulating or rotating member, such as the rotatable switch arm 318.

When not in use, the multi-tool carriage 326 may return to a home position (e.g., automatically navigate to a far corner) to prevent obstruction of the panel. The multi-tool carriage 326 would be equipped with sensors (e.g., proximity sensors) such that it can move out of the way when it detects the pilot's hands. During the initial set-up of the plotter on a new aircraft, the location, type, and position of the secondary flight control panel may be encoded. Once a particular secondary flight control panel is encoded, the configuration can be saved to the aircraft data structure and loaded when automation system 100 is installed in the same aircraft, or the same type of aircraft. In certain aspects, additional actuators may be provided to actuate controllers that are positioned in, for example, the foot well of the cockpit, such as foot pedals (e.g., brake and/or rudder pedals). While the secondary actuation system 108b is generally described as a gantry system, an articulating arm (akin to the arm of the primary actuation system 108a of the tertiary actuation system 108c) may be employed for accessibly to secondary flight controls.

Tertiary Actuation System 108c.

A barrier to entry for cockpit robots, apart from certifiability, is pilot acceptance. Cockpit robots can address pilot acceptance by demonstrably increasing pilot performance and reducing overall mission risk, while keeping pilots from immediately losing their trusted partners (i.e., the human copilot) in favor of a new and untrusted paradigm of technology (i.e., due to inexperience on behalf of the pilot). Unlike the primary actuation system 108a, the tertiary actuation system 108c, however, may be installed in an aircraft without displacing a most-trusted pilot resource (the human copilot) with a relatively untrusted resource (the robot). Moreover, the tertiary actuation system's 108c small size is favorable for operation in high turbulence and will ensure that human pilots can always easily overpower the robot if needed. Conversely, scaling the system upward often causes arm structural elements to increase in weight, while also being subject to increased structural vibration. That is, by placing the tertiary actuation system 108c near the device of interest, the robot will not have to extend as far to reach desired manipulation surfaces compared to, for example, the secondary actuator system. By way of illustration, given an arm of a fixed mass, the moment of inertia about an axis (e.g., the axis of a motor) scales as a function of the distance of the center of gravity of the arm from that axis. Further, on the motor joint of a robot arm that is assumed to be made of perfectly rigid structural elements, turbulence manifests itself as a disturbance acceleration which leads to a torque on the motor joint that is the product of the acceleration and the moment of inertia of the arm. As arm extension increases, the motor torque required to withstand a given acceleration increases by the extension squared. Therefore, the tertiary actuation system 108c can function as an entry level cockpit robot by addressing the operation of a known pilot pain-point (i.e., the CDU 502) to provide the opportunity to increase overall pilot performance, while paving the way of other cockpit robots, such as the primary and secondary actuation systems 108a.

Figure 4:
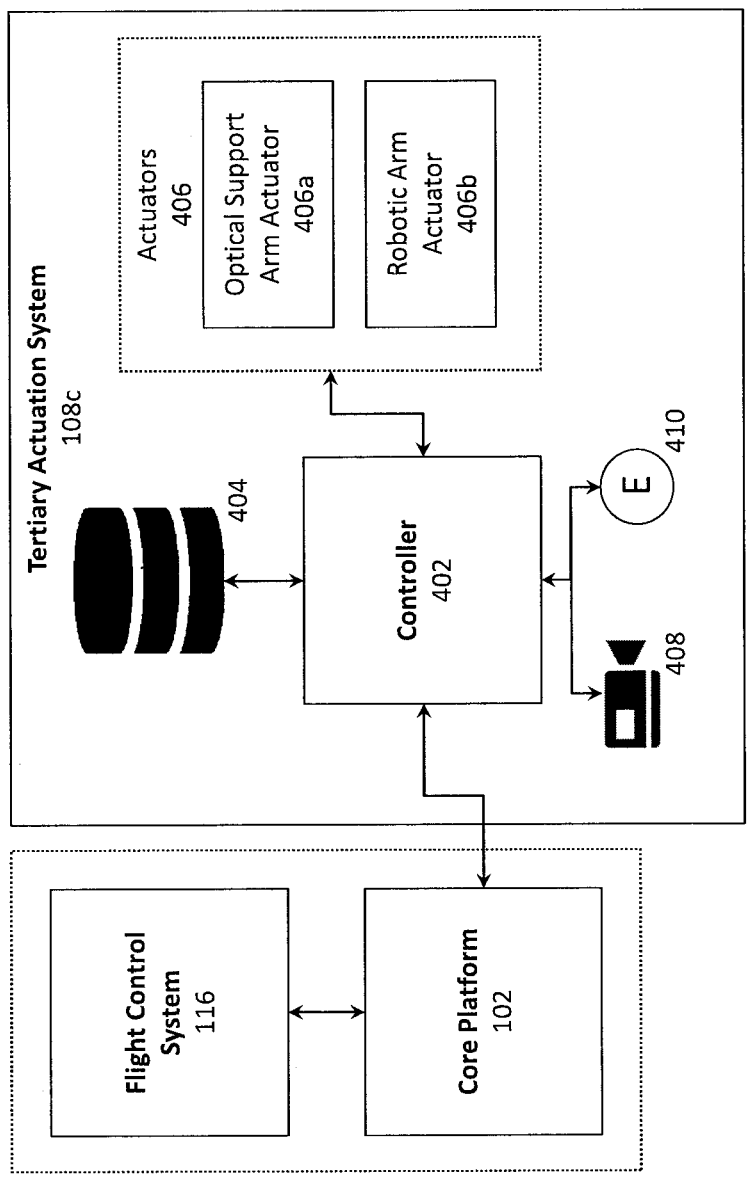
FIG. 4 illustrates a block diagram of an example tertiary actuation system.

FIG. 4 illustrates a block diagram of an example tertiary actuation system 108c, while FIGS. 5a through 5d illustrate the tertiary actuation system 108c mounted beside, or adjacent, an FMS's control display unit (CDU) 502 (e.g., the copilot-side FMS/CDU), near the console 514 of an aircraft cockpit. On many aircraft, the CDU 502 is positioned at an outer-most region of a console 514, usually the center console. The tertiary actuation system 108c may be provided as a small robotic arm that is installed inside an aircraft cockpit next to the CDU 502. The tertiary actuation system 108c generally comprises a compact housing 510, a vision system 524, and a robotic arm assembly 526. Indeed, the tertiary actuation system 108c provides a tightly-packed robot system that can unfold itself to both view the CDU 502 screen (and thus assess the state of the CDU 502) and actuate push buttons 508 on the CDU's 502 keyboard (or even touchscreen). In certain aspects, the tertiary actuation system 108c may be designed to operate only a single (complex) interface, such as the CDU 502, which greatly simplifies the electromechanical design of the system to achieve the required tolerance to turbulence (as compared to the primary and secondary actuation systems 108a, 108b).

The tertiary actuation system 108c operates the more complex interfaces in the cockpit, such as an CDU 502, a radio, or any other device having a keypad, small buttons, etc. Therefore, while an CDU 502 is illustrated, the tertiary actuation system 108c may be used with other devices. As illustrated, the CDU 502 generally comprises a CDU display device 504 (e.g., an LCD display) and a keypad 506 (or keyboard) having a plurality of push buttons 508 (or keys). The tertiary actuation system 108c can employ software to enable machine vision, robot arm control, and an ability to receive commands and send status updates to a higher-level aircraft system, such as the core platform 102, the HMI system 104, etc. In operation, a pilot traditionally operates the CDU 502 by monitoring the CDU display device 504 and selectively engaging the push buttons 508 of the keypad 506 by pressing a desired push button 508.

Given the size of the CDU display device 504 and the push buttons 508, it can be difficult for the primary actuation system 108a and/or the secondary actuation system 108b to engage accurately the CDU 502, especially in an environment subject to vibration, such as a cockpit. Accordingly, the tertiary actuation system 108c, which is significantly smaller than the primary actuation system 108a and the secondary actuation system 108b (more along the size scale of a human hand than a human arm), may be secured adjacent the CDU 502. In operation, the tertiary actuation system 108c monitors the CDU 502 (e.g., the CDU display device 504) via a vision system 524 and engages the push buttons 508 via a compact robotic arm 520. The tertiary actuation system 108c is well-suited to operate the CDU 502 or another interface positioned adjacent the tertiary actuation system 108c. Another issue can be the location of the user interface (e.g., a CDU). Often, these interfaces/displays are positioned forward (in an airplane coordinate system) of the center console that contains levers (e.g., the throttle). Depending on placement of the actuation system (e.g., the secondary actuation system 108b), it can be prohibitively challenging to reach over/around the throttle and other levers.

The tertiary actuation system 108c offers certain advantages over the primary and secondary actuation systems 108a, 108b as they relate to small, complex interfaces in the cockpit. First, the small size of the tertiary actuation system 108c relative to the other robotics systems provides a design that is more tolerant to turbulence (e.g., forces from acceleration scale with the square of the moment arm). This is true for both the compact robotic arm 520 that engages the CDU 502 and the vision system 524. Moreover, the small size of the tertiary actuation system 108c makes it easier and safer for a human pilot to overpower the compact robotic arm 520 if the need arises. Second, the tertiary actuation system 108c may be device-specific and, to that end, operation may be limited to a finite number of degrees-of-freedom (DOFs) as needed for the specific device, thereby increasing simplicity. Third, the small size and short travel of the compact robotic arm 520 may result in significantly faster operation of the CDU 502. Finally, unlike the primary actuation system 108a, which physically occupies the place of a pilot, the small size of the tertiary actuation system 108c makes it possible to install the tertiary actuation system 108c in a traditional two-pilot cockpit without removing either human pilot. Therefore, the tertiary actuation system 108c is small and compact to enable it to co-exist with two human pilots in a conventional aircraft cockpit, which is unprecedented in the field of cockpit automation.

As illustrated in FIG. 4, the tertiary actuation system 108c may comprise an actuation controller 402 that is operatively coupled with a memory device 404 having software and/or a database provided thereon, a plurality of actuators 406 (e.g., optical support arm actuators 406a, and robotic arm actuators 406b) to control movement of the vision system and the robotic arm assembly, and one or more sensors, such as optical sensors 408 (used for the vision system) and/or positional feedback sensors, such as encoders 410. The plurality of actuators 406 may be one or more of linear (straight line), rotary (circular), or oscillatory actuators, which may be driven through one or more of electrical, pneumatic, and/or hydraulic techniques. The actuation controller 402 may be, for example, a processor configured to receive and implement commands from the core platform 102 (or another subsystem) and to provide feedback thereto. In other words, the actuation controller 402 may control operation of the plurality of actuators 406 based on information received from the core platform 102, the one or more sensors, etc. For example, the actuation controller 402 may selectively control the optical support arm actuators 406a to adjust the position of the vision sensor and/or selectively control the robotic arm actuators 406b to adjust the position of the robotic arm assembly.

Figure 5A:
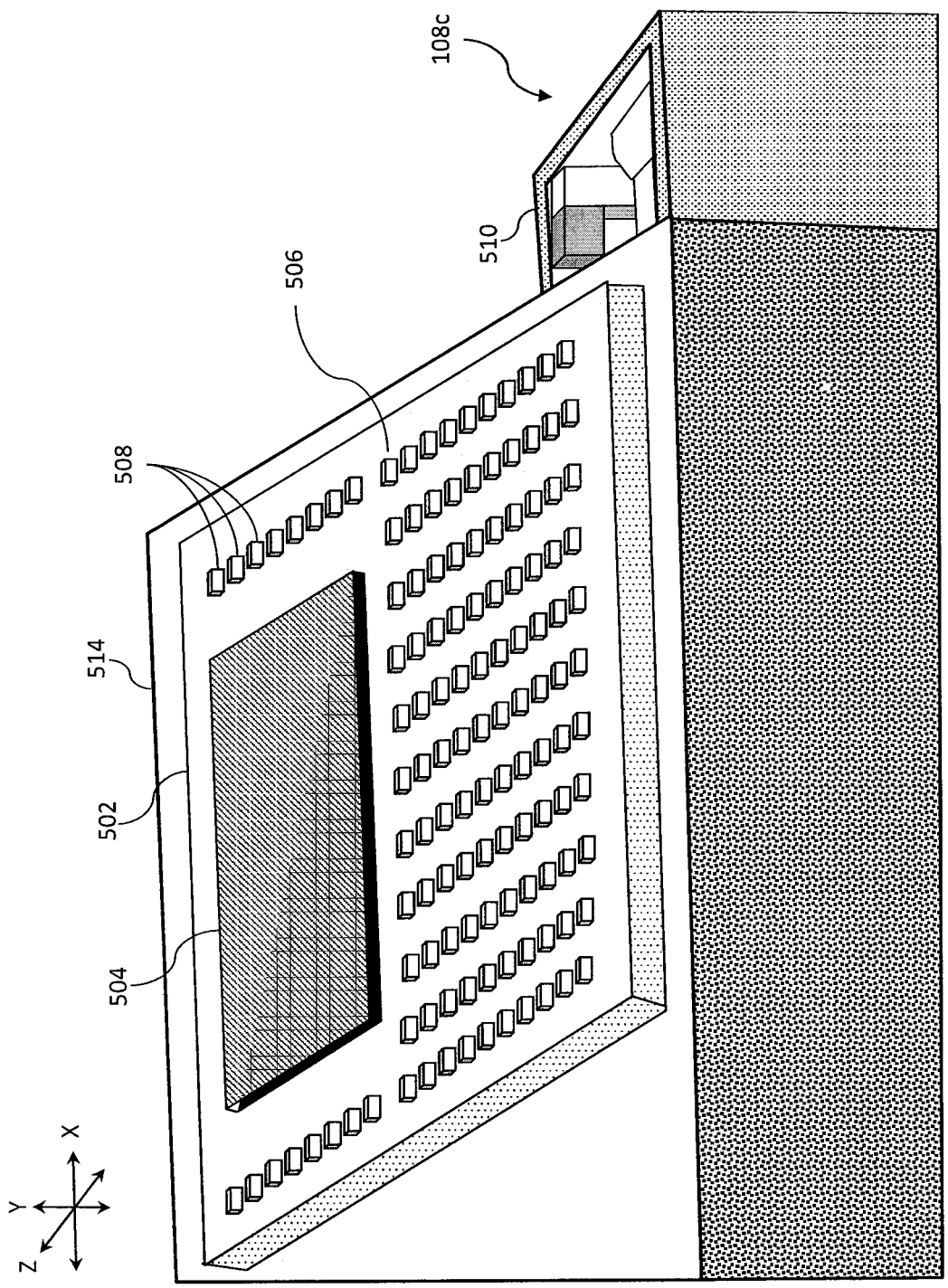
FIGS. 5a through 5d illustrate an example tertiary actuation system.

As illustrated in FIG. 5a, the compact housing 510 may be mounted to a side (e.g., a vertical surface) of the console 514 to secure the tertiary actuation system 108c relative to the CDU 502, for example, adjacent the CDU 502. The tertiary actuation system 108c may be provided as a small device-specific robot to operate the CDU 502 without taking a human pilot's spot in the aircraft, which requires that the vision system 524, the robotic arm assembly 526, software (embodied on a memory device), and the actuation controller 402 to fit inside a small case that couples to the side of the structure that holds the CDU 502, such as the console 514. Indeed, the tertiary actuation system 108c may include an actuation controller 402 to control operation of the vision system 524 and the robotic arm assembly 526, while also exchanging data with the core platform 102. The tertiary actuation system 108c may be fabricated using lightweight metals, metal alloys, and/or composite materials. Suitable materials can include, inter alia, aluminum, steel, titanium, magnesium, aerospace-grade composites, etc. (including those that can be 3d-printed).

Figure 5B:
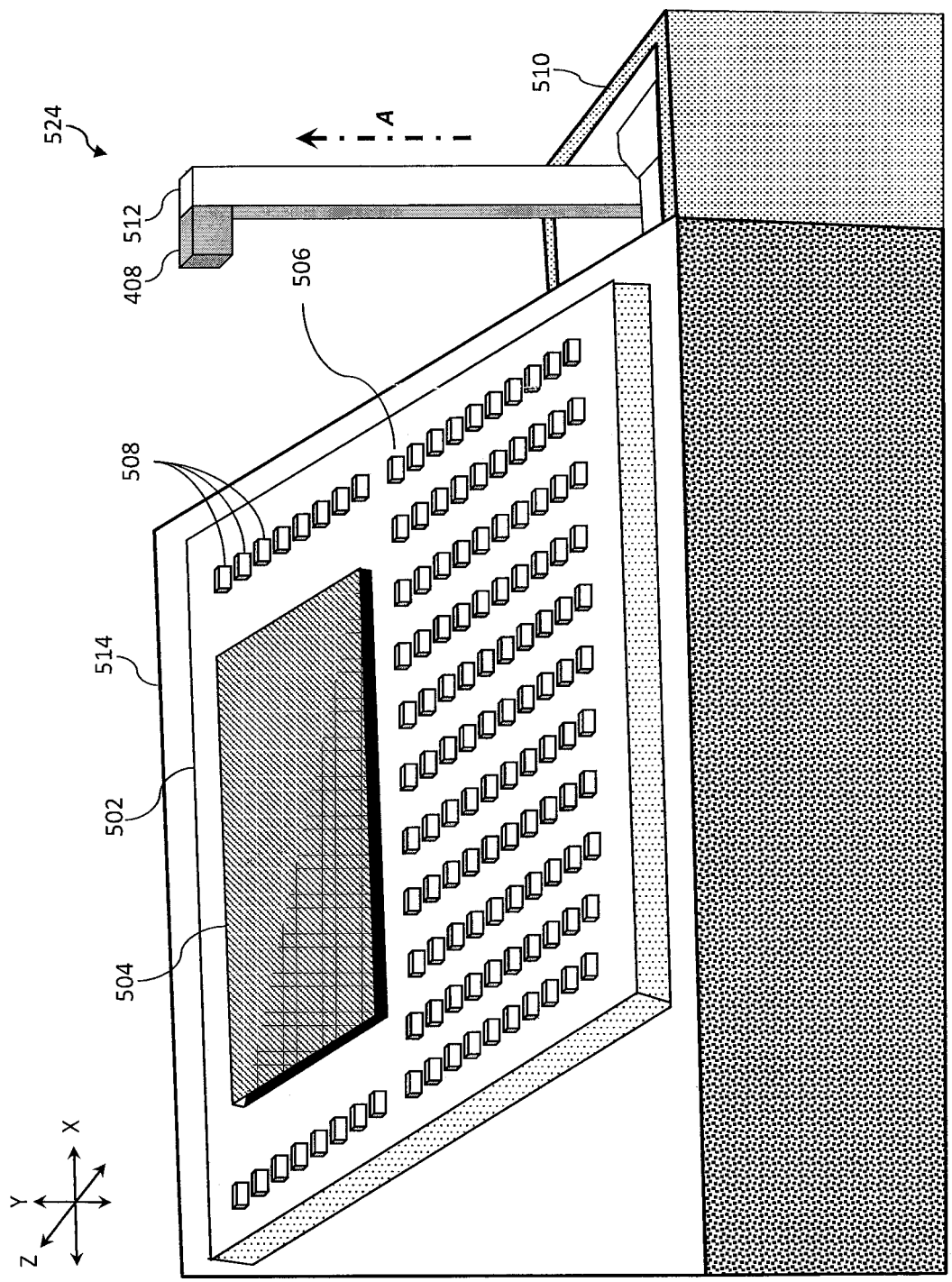

As illustrated in FIG. 5b, the vision system 524 may extend upwardly (i.e., direction A) from the compact housing 510 to a predetermined height to achieve a better optical view of the CDU 502. The vision system 524 may include, for example, one or more wide-angle cameras, each having a field of view of about 180 degrees. The vision system 524 may be used to optically read (i.e., image) and interpret (via the actuation controller 402) the CDU display device 504. The vision system 524 generally comprises an optical sensor 408 coupled to a distal end of an optical support arm 512 (e.g., a linear structure, such as a post). In certain aspects, the vision system 524 may be configured to also visually monitor operation of the robotic arm assembly 526. For example, if the robotic arm assembly 526 is instructed to perform a particular task, the vision system 524 may visually monitor the robotic arm assembly 526, via the optical sensor 408, to ensure that the robotic arm assembly 526 is responding and accurately engaging the desired user-actuable device (e.g., a specific push button). If the robotic arm assembly 526 is not aligned with the correct user-actuable device, the actuation controller 402 may adjust the operation of the robotic arm assembly 526 to align the contact tip 522 of the robotic arm assembly 526 with the desired user-actuable device. Where if the robotic arm assembly 526 is non-responsive, the pilot may be alerted and instructed to assume control of the CDU 502.

The optical sensor 408 may include, for example, one or more high-definition, stereo cameras and/or a light detection and ranging (LIDAR) laser scanner. The optical sensor 408 may employ a monocular camera and/or a stereo camera, which may provide faster development and installation (e.g., self-calibration). The tertiary actuation system's 108c actuation controller 402 may employ machine vision algorithms stored to the memory device 404 to interpret, inter alia, the CDU display device 504 (or other devices) and mechanical items such as the user-actuable device (e.g., push buttons 508, switches, and breakers) to provide a real-time FMS-state update to the core platform 102. The optical support arm 512 may be slideably coupled to the compact housing 510 via, for example, a linear rail, which may be powered by a screw, capstan, rack and pinion, etc. In certain aspects, the optical support arm 512 may be fixed at one end (e.g., the proximal end) and configured to telescope such that the distal end, which may be equipped with the optical sensor 408, is raised upward to view the screen of the CDU 502. To reduce complexity, the optical support arm 512 may be configured with, or restricted to, only one actuated degree of freedom (i.e., upward and downward relative to the compact housing 510). For example, the optical support arm 512 may extend upwardly (i.e., direction A) to view the screen of the CDU 502 when deployed (as best illustrated in FIG. 5b) and retract downwardly and into a cavity defined by the compact housing 510 when stowed (as best illustrated in FIG. 5a).

Figure 5C:
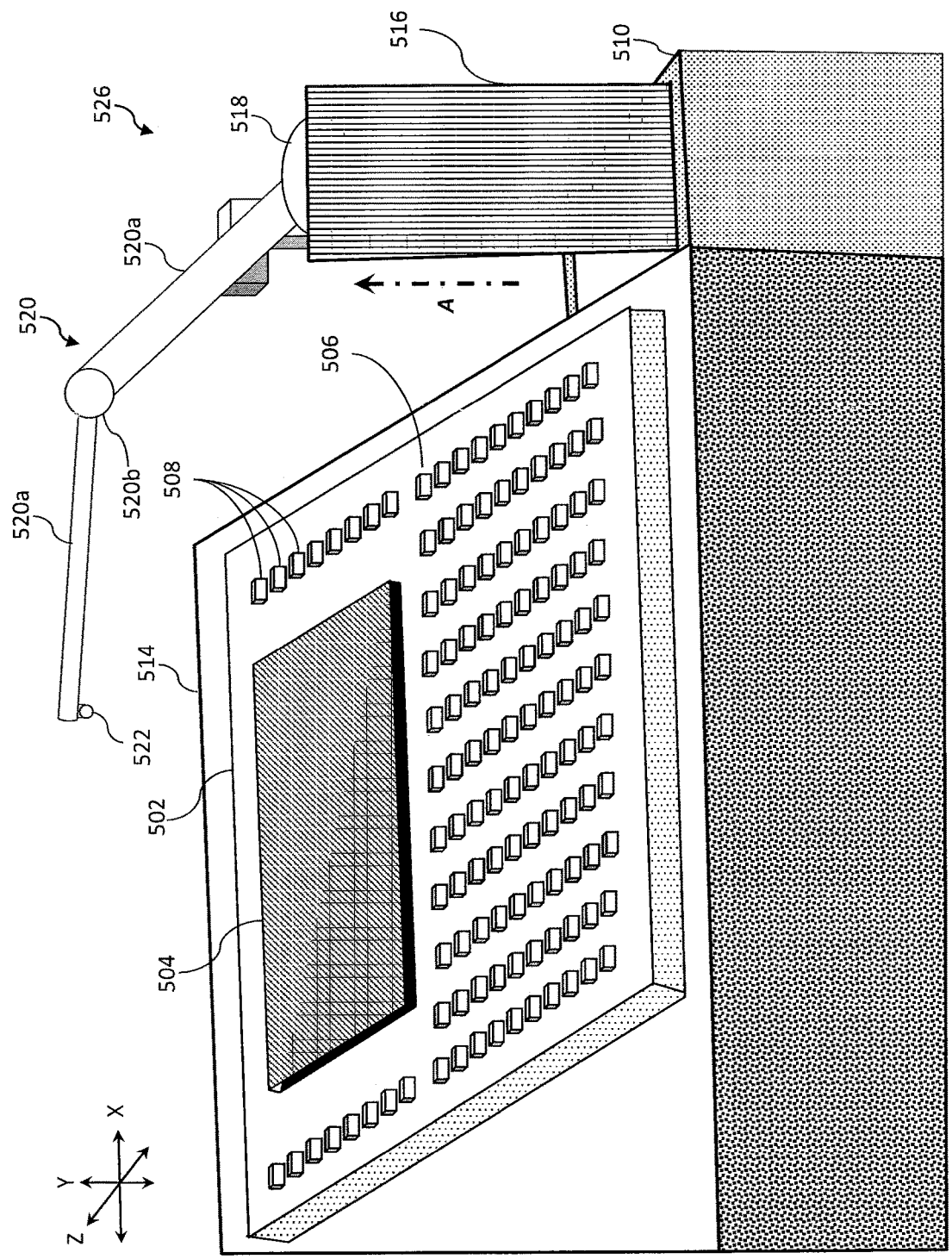
Figure 5D:
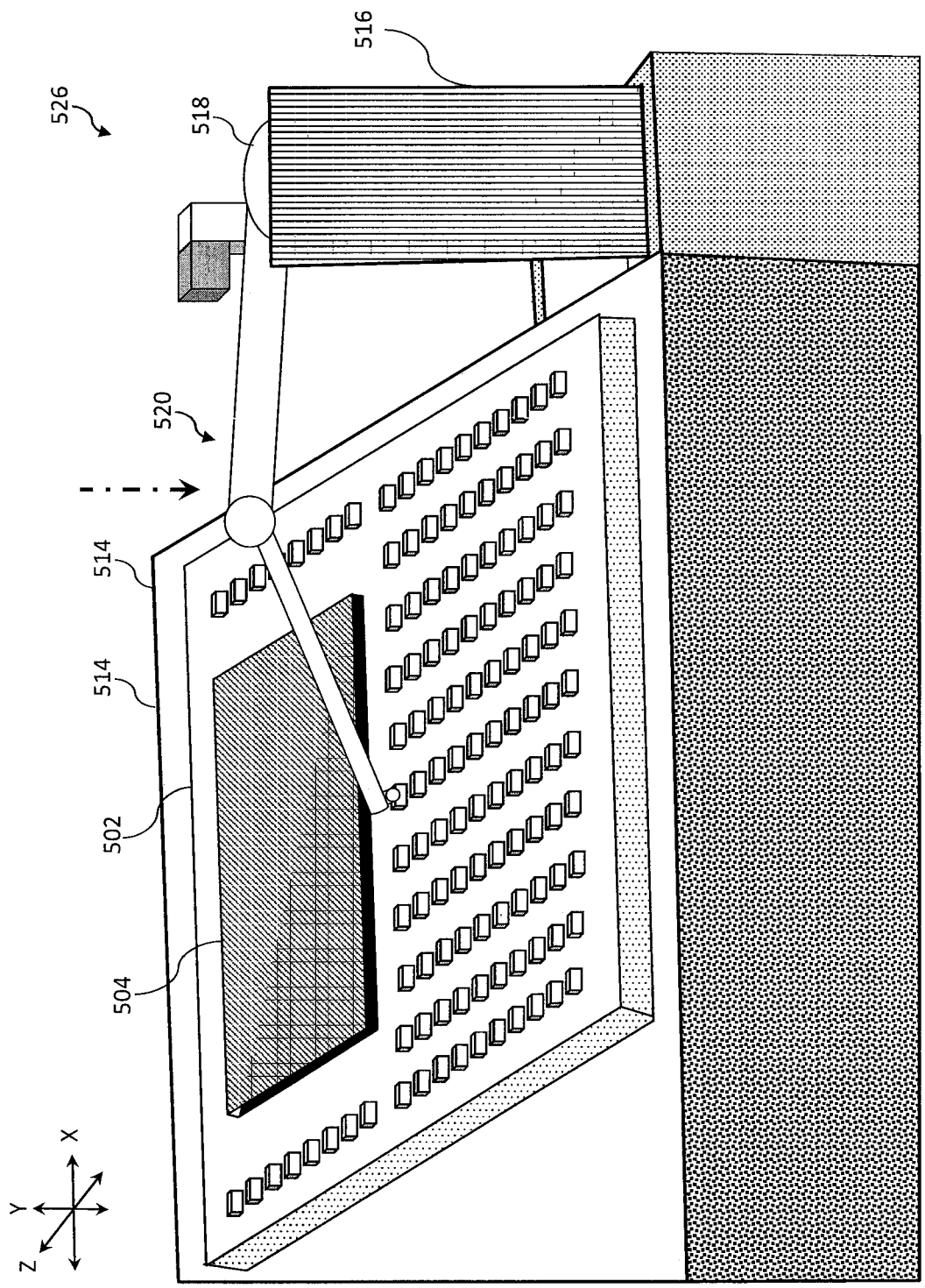

As illustrated in FIG. 5c, when deployed, the robotic arm assembly 526 may similarly extend from the compact housing 510 to a predetermined height to allow the compact robotic arm 520 to physically manipulate and engage the CDU 502. The compact robotic arm 520 may be coupled to the compact housing 510 via an arm support structure 516. The arm support structure 516 may extend upwardly (e.g., slide) along axis (i.e., parallel to the Y-axis) relative to the compact housing 510 (enabling the compact robotic arm 520 to engage the CDU 502) when deployed and retract downwardly relative to the compact housing 510 when stowed. For example, a linear actuator may be provided in the compact housing 510 and operatively coupled to the actuation controller 402 to move the arm support structure 516 relative to the compact housing 510 along one or more tracks and restricted to a single degree of freedom. To that end, the arm support structure 516 may be coupled to the compact housing 510 via one or more tracks (e.g., extension ball bearing slides).

A contact tip 522 may be provided at the distal end of the robotic arms 520 to contact the push buttons 508 and/or the CDU display device 504. To increase friction and improve contact, the contact tip 522 may be fabricated using, for example, a rubber tip. In certain aspects, the CDU display device 504 may employ a touch screen (i.e., a touch sensitive layer—such as a resistive or capacitive touch screen). Therefore, where a touch screen needs to be engaged, the contact tip 522 may be fabricated from conductive fiber material so as to interact with the touch screen.

The contact tip 522 may have a sensor (e.g., a force or pressure sensor) to sense that buttons have been pressed. Compliant tactile interaction with buttons (e.g., sufficient to actuate/engage the button or other controller) may be further verified as a function of information from the sensor, the kinematics of the robot arm, and/or the motor torques of the robot arm. For example, most mechanical buttons exhibit a force-deflection relationship that provides an identifiable signature (e.g., a unique signature) to verify that a button has been pressed, which would be very different than, for example, pushing the finger into a static wall. In other words, the system may verify compliant tactile interaction by combining information reflecting the motion of the robot arm, the estimated force applied by the motor arm by measuring motor torques, and the measured force in the finger to verify proper performance. For example, the interaction characteristics of the robot arm can be recorded to memory and compared to pre-recorded data of interactions deemed to be compliant (e.g., good) and non-compliant (e.g., bad). In the event that an interaction (or interactions) is operating out of specification, the robot and/or human pilot can take necessary action—e.g., turning off the robot, or performing a self-recalibration. This real-time constant monitoring system will enhance performance of the robot.

The compact robotic arm 520 may be pivotally coupled with the arm support structure 516 via a pivot hinge 518. In operation, the compact robotic arm 520 may be used to press the push buttons 508 on the keypad 506 of the CDU 502. The compact robotic arm 520 unfolds from the compact housing 510. The compact robotic arm's 520 ability to unfold achieves a small footprint and complete non-invasiveness when unpowered (stowed). The compact robotic arm 520 is preferably sized to reach all of the push buttons 508 on the CDU 502 (or other interface, as the case may be). The compact robotic arm 520 may be fabricated using one or more electromechanical design methods. For example, the compact robotic arm 520 may comprise two or more boom sections 520a coupled end-to-end via pivotal joints 520b to form the compact robotic arm 520. The pivot hinge 518 may be used to rotate the compact robotic arm 520 relative to the arm support structure 516 about an axis (i.e., parallel to the Z-axis). For example, the pivot hinge 518 may rotate, under the power of a robotic arm actuator 406b, 180 degrees in each direction relative to the arm support structure 516, thereby providing a total of 360 degrees of rotation. The compact robotic arm 520 may be, for example, a fully articulated, electrically powered arm, which may be powered by one or more robotic arm actuators 406b. The plurality of jointed boom sections 520a may be folded into a small space when the compact robotic arm 520 is not in use to facilitate stowage. One or more of the boom sections 520a may be telescopic, thus providing a greater reach.

Like the articulating arm 202 of the primary actuation system 108a, the compact robotic arm 520 can be equipped with an encoder for each of its degrees of freedom to ensure exact positioning of the compact robotic arm 520. The encoders can be mounted at the robotic arm actuator 406b, or at the pivotal joint 520b itself (e.g., down-stream of any gearbox or other linkage). Internal clutches may be provided at each hinged or pivotal joint 520b such that the compact robotic arm 520 can be overpowered by the pilot if so desired, without damaging the compact robotic arm 520. In such a case, the automation system 100 may determine the position or location of the compact robotic arm 520 using the encoders. Alternatively, because the maximum load that the robot must exert on the CDU 502 is low (i.e., sufficient to actuate a push buttons 508), the compact robotic arm 520 may include frangible links to enable the pilot to permanently disengage the system. For example, the compact robotic arm 520 may include one or more frangible links at the pivot hinge 518 or the pivotal joints 520b to disable the 108c tertiary actuation system 108c.

While the tertiary actuation system 108c has been described primarily in terms of cockpit usage, the tertiary actuation system 108c may be employed in virtually any existing system where automation is desired, including, inter alia, rail systems, machining centers (e.g., CNC machines), robot operation of existing medical systems, chemical processing plants, etc. Small robots, such as the tertiary actuation system 108c, may be used to operate human interfaces that are obsolete, but still functional. Further, the automation system 100 and derivative technologies may be applied across a wide range of aircraft and flight simulators. The derived flight performance characteristics from an aircraft flight test can be used to improve the fidelity of flight simulators used to train pilots. Providing flight simulators access to actual aircraft performance data has tremendous value for flight simulator operators.

The automation system 100 furthers the safety and utility of commercial aviation operations while providing significant savings in human operating costs. For example, the automation system 100 may be applied to long-haul air cargo carriers to increase safety and efficiency as well the cost-savings of this advanced pilot-assist technology. Further, the ultimate state machine, for example, may serve as a training tool for pilots in-flight, or as a safety system, providing a second set of eyes in what would traditionally be a single-pilot aircraft. Portions of the human-machine interface streamline all piloted flight operations, even multi-crew operations.

The above-cited patents and patent publications are hereby incorporated by reference in their entirety. Although various embodiments have been described with reference to a particular arrangement of parts, features, and like, these are not intended to exhaust all possible arrangements or features, and indeed many other embodiments, modifications, and variations may be ascertainable to those of skill in the art. Thus, it is to be understood that the invention may therefore be practiced otherwise than as specifically described above.

What is claimed is:

1. An actuation system to manipulate a control interface, the actuation system comprising:
   an actuation controller;
   a vision system operatively coupled to the actuation controller to optically image a display device of the control interface;
   a robotic arm assembly operatively coupled to the actuation controller to engage a user-actuable device of the control interface;
   a housing configured to affix to a surface adjacent the control interface, wherein each of the vision system and the robotic arm assembly are coupled to and supported by the housing,
   wherein actuation controller is configured to instruct the robotic arm assembly based at least in part on data from the vision system.

2. The actuation system of claim 1, wherein the vision system includes an optical support arm and a camera mounted at an end of the optical support arm.

3. The actuation system of claim 2, wherein each of the vision system and the robotic arm assembly are configured to retract into a cavity defined by the housing.

4. The actuation system of claim 1, wherein the robotic arm assembly includes a robotic arm and a contact tip.

5. The actuation system of claim 4, wherein the contact tip comprises a conductive fiber material.

6. The actuation system of claim 4, wherein the robotic arm is slideably coupled to the housing via a slideable arm support structure.

7. The actuation system of claim 1, wherein each of the vision system and the robotic arm assembly are slideably coupled to the housing.

8. The actuation system of claim 1, wherein the actuation controller is communicatively coupled with a human machine interface, the actuation controller being responsive to commands from the human machine interface.

9. The actuation system of claim 1, wherein the actuation controller is configured to instruct the robotic arm assembly to engage the user-actuable device in response to commands from a core platform.

10. The actuation system of claim 1, wherein the vision system is configured to monitor operation of the robotic arm assembly visually.

11. The actuation system of claim 10, wherein the actuation controller is configured to adjust o peration of the robotic arm assembly to align a contact tip of the robotic arm assembly based at le ast in part on feedback from the vision system.

12. The actuation system of claim 1, wherein the vision system is configured to provide a field of view of about at least 180 degrees.

13. A method for manipulating a control interface using an actuation system, the actuation system comprising an actuation controller, a vision system, a robotic arm assembly, and a housing, the method comprising:
   optically imaging a display device of the control interface via the vision system;
   engaging, via the robotic arm assembly, a user-actuable device of the control interface based at least in part on information from the vision system,
       wherein the robotic arm assembly and the vision system are each operatively coupled to the actuation controller, and
       wherein each of the vision system and the robotic arm assembly are coupled to and supported by a housing that is affixed to a surface adjacent the control interface; and
   instructing, via the actuation controller, the robotic arm assembly to actuate the user-actuable device based at least in part on data from the vision system.

14. The method of claim 13, wherein the vision system includes an optical support arm and a camera mounted at an end of the optical support arm.

15. The method of claim 13, further comprising the step of retracting each of the vision system and the robotic arm assembly into a cavity defined by the housing.

16. The method of claim 13, wherein the robotic arm assembly includes a robotic arm and a contact tip.

17. The method of claim 16, wherein the robotic arm is slideably coupled to the housing via a slideable arm support structure.

18. The method of claim 16, further comprising the step of adjusting an operation of the robotic arm assembly to align the contact tip based at least in part on feedback from the vision system.

19. The method of claim 13, wherein the actuation controller is communicatively coupled with a core platform that provides for communicating between an aircrew member and the actuation system.

20. The method of claim 19, wherein the core platform is communicatively coupled with a human machine interface to provide communicating between the aircrew member and the actuation system.

21. The method of claim 13, further comprising the step of instructing, via the actuation controller, the robotic arm assembly to engage the user-actuable device in response to commands.

* * * * *